(12) United States Patent
Köhler et al.

(10) Patent No.: US 6,664,342 B1
(45) Date of Patent: Dec. 16, 2003

(54) POLYCARBONATES CONTAINING ASPARTIC ACID-ESTER FUNCTIONAL SILICONES

(75) Inventors: Burkhard Köhler, Leverkusen (DE); Klaus Horn, Dormagen (DE)

(73) Assignee: Bayer Aktiengesellschaft, Leverkusen (DE)

( * ) Notice: Subject to any disclaimer, the term of this patent is extended or adjusted under 35 U.S.C. 154(b) by 3 days.

(21) Appl. No.: 10/031,912

(22) PCT Filed: Jul. 6, 2000

(86) PCT No.: PCT/EP00/06381

§ 371 (c)(1), (2), (4) Date: Jan. 15, 2002

(87) PCT Pub. No.: WO01/05870

PCT Pub. Date: Jan. 25, 2001

(30) Foreign Application Priority Data

Jul. 19, 1999 (DE) .......................... 199 33 129
Jul. 19, 1999 (DE) .......................... 199 33 077

(51) Int. Cl.$^7$ ...................... C08G 77/448; C08G 64/18; C08G 64/08
(52) U.S. Cl. ................ 525/464; 525/474; 525/479; 528/25; 528/26; 528/28; 528/29; 528/203
(58) Field of Search ................... 525/464, 474, 525/479; 528/25, 26, 28, 29, 203

(56) References Cited

U.S. PATENT DOCUMENTS

| 2,947,771 A | * | 8/1960 | Bailey |
| 3,033,815 A | * | 5/1962 | Pike |
| 3,743,588 A | | 7/1973 | Brown, Jr. et al. ..... 204/195 M |
| 3,849,359 A | * | 11/1974 | Nitzsche |
| 4,374,236 A | * | 2/1983 | Znaiden |
| 5,194,524 A | | 3/1993 | Peters ......................... 525/464 |

FOREIGN PATENT DOCUMENTS

| DE | 44 21 556 | 12/1995 |
| EP | 0 764 676 | 3/1997 |
| EP | 0 924 231 | 6/1999 |

* cited by examiner

*Primary Examiner*—David J. Buttner
(74) *Attorney, Agent, or Firm*—Joseph C. Gil; Aron Preis

(57) ABSTRACT

Aspartate-functional silicone and the process for its preparation is disclosed. Also disclosed are aromatic polycarbonate that contains the inventive aspartate-functional silicone, a process for its preparation and its use in making molded articles.

10 Claims, No Drawings

POLYCARBONATES CONTAINING ASPARTIC ACID-ESTER FUNCTIONAL SILICONES

The invention relates to aromatic polycarbonates, containing aspartate-functional silicones, that are distinguished by very good low-temperature impact strength and very good ESC behaviour.

Aromatic polycarbonates are highly impact-resistant plastics which are distinguished by very good impact resistance at room temperature. One disadvantage is their susceptibility to solvents (stress cracking, ESC behaviour) and their declining notch impact strength at temperatures below 0° C.

It has now been found that aromatic polycarbonates containing aspartate-functional silicones, which can be produced by incorporation of the aspartate-functional silicones during the synthesis of polycarbonate from bisphenols and derivatives of carbonic acid or by reaction of unmodified aromatic polycarbonate with aspartate-functional silicones, are distinguished by very good low-temperature impact strength and very good ESC behaviour.

The invention therefore provides aromatic polycarbonates with 1 to 30 wt.%, preferably 5 to 15 wt. %, aspartate-functional silicones, obtainable by reaction of bisphenols and aspartate-functional silicones with derivatives of carbonic acid or by reaction of polycarbonates with aspartate-functional silicones.

Use is preferably made of aspartate-functional silicones that are obtainable by addition of fumarate and/or maleates of the formula (I)

ROOC—CH=CH—COOR        (I)

where R stands for a $C_1$–$C_4$ alkyl or alkenyl residue onto amino-functional silicones.

These compounds are new and are likewise a subject of the invention.

Conversion is preferably effected at temperatures from 120 to 250° C. in the presence of acidic catalysts such as, for example, p-toluenesulfonic acid, basic catalysts such as, for example, alkali alcoholates, or metal catalysts such as, for example, dibutyltin oxide, $SnCl_2$, Sn(II) carboxylates or salts of transition metals.

The amino-functional silicones that are used in accordance with the invention may also be produced by hydrosilylation, analogous to polymerisation, of SiH-functional silicones with unsaturated amines, preferably allylamine.

The amine equivalent weight of the aspartate-functional silicones according to the invention and of the amino-functional silicones used as educts amounts to 1,000 to 50,000 g/g. equiv., preferably 4,000 to 20,000 g/g. equiv. The molecular weight of the aspartate-functional silicones amounts to 2,000 to 5,000,000 g/mol, preferably 20,000 to 2,000,000 g/mol.

Production of the aspartate-functional silicones is effected by amino-functional silicones being converted with compounds of the formula (I).

The molar ratio of amino groups to compounds of the formula (I) amounts to 1:1 to 1:20, preferably 1:2 to 1:10; the reaction is carried out for 1 to 10 hours at 80 to 220° C., preferably in the absence of solvents or catalysts, the excess of compounds of the formula (I) subsequently being distilled off at a pressure from 1 to 100 mbar and at temperatures from 150 to 250° C. In a preferred embodiment the amino-functionalisation of the open-chain siloxanes and/or cyclic oligosiloxanes with aminosilanes and the subsequent conversion with compounds of the formula (I) are carried out in succession in a one-pot reaction.

In the case where use is made of aminopropyl methyldiethoxysilane by way of aminosilane for the amino-functionalisation and diethyl maleate by way of compound of the formula (I), an aspartate-functional silicone is obtained that contains the following structural unit:

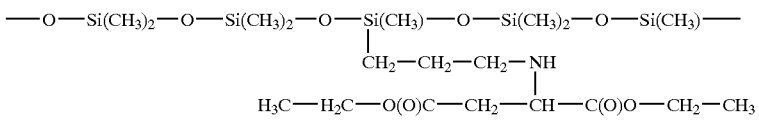

Preferred compounds of the formula (I) are methyl maleate, methyl fumarate, ethyl maleate, ethyl fumarate, n-propyl maleate, n-propyl fumarate, isopropyl maleate, isopropyl fumarate, n-butyl maleate, n-butyl fumarate, i-butyl maleate, i-butyl fumarate, sec-butyl maleate, sec-butyl fumarate, tert-butyl maleate, tert-butyl fumarate, allyl maleate or allyl fumarate.

The amine-functional silicones are available by reaction of open-chain siloxanes and/or cyclic oligosiloxanes, in which 45 to 100% of the substituents on the siloxane groups are methyl groups and the remainder are preferably phenyl groups, with aminosilanes, preferably with aminosilanes of the formula (II)

$H_2N$—X—$Si(OR)_n(CH_3)_{3-n}$        (II)

where
R conforms to the meaning stated above,
X is a divalent organic residue with 2 to 22 carbon atoms, preferably —$CH_2$—$CH_2$—$CH_2$— and
n is 1 or 2 or 3, preferably 2 or 3, with 2 being quite particularly preferred.

The aspartate-functional silicones according to the invention can be employed as soft blocks or as impact-strength modifiers for plastics.

Suitable aromatic polycarbonates by way of reaction partners in accordance with the invention for the aspartate-functional silicones are those based on diphenols of the formula (III)

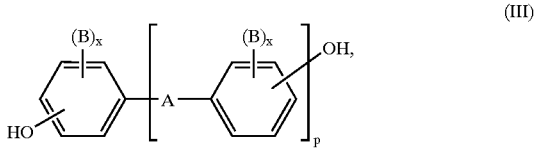

in which
A is a single bond, $C_1$–$C_5$ alkylene, $C_2$–$C_5$ alkylidene, $C_5$–$C_6$ cycloalkylidene, —S— or $SO_2$,
B is chlorine, bromine
x is 0, 1 or 2 and
p is 1 or 0 or alkyl-substituted dihydroxyphenyl cycloalkanes of the formula (IV)

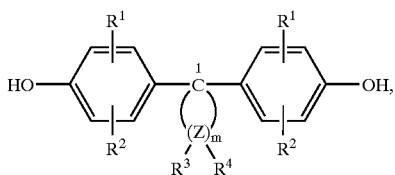

in which
R$^1$ and R$^2$ signify, independently of one another, hydrogen, halogen, preferably chlorine or bromine, C$_1$–C$_8$ alkyl, C$_5$–C$_6$ cycloalkyl, C$_6$–C$_{10}$ aryl, preferably phenyl, and C$_7$–C$_{12}$ aralkyl, preferably phenyl-C$_1$–C$_4$-alkyl, in particular benzyl,
m signifies an integer from 4 to 7, preferably 4 or 5,
R$^3$ and R$^4$, capable of being chosen individually for each Z, signify, independently of one another, hydrogen or C$_1$–C$_6$ allyl
and
Z signifies carbon, with the proviso that on at least one atom Z R$^3$ and R$^4$ simultaneously signify alkyl.

The following may be mentioned by way of examples: hydroquinone, resorcinol, dihydroxydiphenyl, bis(hydroxyphenyl)alkanes, bis(hydroxyphenyl)cycloalkanes, bis(hydroxyphenyl)sulfides, bis(hydroxyphenyl)ethers, bis(hydroxyphenyl)ketones, bis(hydroxyphenyl)sulfoxides, bis(hydroxyphenyl)sulfones and β,β-bis(hydroxyphenyl)diisopropylbenzenes as well as the ring-alkylated and ring-halogenated compounds thereof.

Suitable diphenols are described, for example, in U.S. Pat. Nos. 3,028,365, 2,999,835, 3,062,781, 3,148,172 and 4,982,014, in German Offenlegungsschriften 1 570 703 and 2 063 050 and also in the monograph "H. Schnell, Chemistry and Physics of Polycarbonates, Interscience Publishers, New York, 1964".

Preferred diphenols are
4,4'-dihydroxydiphenyl,
2,2-bis(4-hydroxyphenyl)propane,
2,4-bis(4-hydroxyphenyl)-2-methylbutane,
1,1-bis(4-hydroxyphenyl)cyclohexane,
α,α-bis(4-hydroxyphenyl)-p-diisopropylbenzene,
2,2-bis(3-methyl-4-hydroxyphenyl)propane,
2,2-bis(3-chlorohydroxyphenyl)methane,
bis(3,5-dimethyl-4-hydroxyphenyl)methane,
2,2-bis(3,5-dimethyl-4-hydroxyphenyl)propane,
bis(3,5-dimethyl-hydroxyphenyl)sulfone,
2,4-bis(3,5-dimethyl-4-hydroxyphenyl)-2-methylbutane,
1,1-bis(3,5-dimethyl-4-hydroxyphenyl)cyclohexane
α,α'-bis(3,5-dimnethyl-4-hydroxyphenyl)-p-diisopropylbenzene,
1,1-bis(4-hydroxyphenyl)-3,3,5-trimlethylcyclohexane,
1,1-bis(4-hydroxyphenyl)-3-methylcyclohex and,
1,1-bis(4-hydroxyphenyl)-3,3-dimethylcyclohexane,
1,1-bis(4-hydroxyphenyl)-4-methylcyclohexane,
2,2-bis(3,5-dichloro-4-hydroxyphenyl) propane and
2,2-bis(3,5-dibromo-4-hydroxyphenyl)propane.
Particularly preferred diphenols are, for example:
2,2-bis(4-hydroxyphenyl)propane,
2,2-bis(3,5-dimethyl-4-hydroxyphenyl)propane,
2,2-bis(3,5-dichloro-4-hydroxyphenyl)propane,
2,2-bis(3,5-dibromo-4-hydroxyphenyl)propane,
1,1-bis(4-hydroxyphenyl)cyclohexane,
1,1-bis(4-hydroxyphenyl)-3,3,5-trimethylcyclohexane,
1,1-bis(4-hydroxyphenyl)-3-methylcyclohexane,
1,1-bis(3,5-dimethyl-4-hydroxyphenyl)-4-methylcyclohexane.

In particular, 2,2-bis(4-hydroxyphenyl)propane and 1,1-bis(4-hydroxyphenyl)3,3,5-trimethylcyclohexane are preferred.

Use may also be made of arbitrary mixtures of the aforementioned diphenols.

For the purpose of improving the rheological behaviour, small quantities, preferably quantities between 0.05 and 2.0 mol. % (relative to moles of diphenols employed), of trifunctional or more than trifunctional compounds, in particular those with three or more than three phenolic hydroxyl groups, may also be used concomitantly in known manner. Some of the usable compounds with three or more than three phenolic hydroxyl groups are, for example, 1,3,5-tri(4-hydroxyphenyl)benzene, 1,1,1-tri(4-hydroxyphenyl)ethane, 2,6-bis(2-hydroxy-5'-methylbenzyl)-4-methylphenol, 2-(4-hydroxybenyl)-2-(2,4-dihydroxyphenyl)propane, hexa(4-(4-hydroxyphenylisopropyl)phenyl)orthoterephthalate, tetra (4-hydroxyphenyl)methane and 1,4-bis(4',4"-dihydroxytriphenyl)methyl)benzene. Some of the other possible trifunctional compounds are 2,4-dihydroxybenzoic acid, trimesic acid, cyanuric chloride and 3,3-bis(4-hydroxy-3-methylphenyl)-2-oxo-2,3-dihydroindole.

Production of the block polycarbonates according to the invention can be effected substantially by the known solution process in dispersed phase (so-called two-phase interface process) (cf. H. Schnell, "Chemistry and Physics of Polycarbonates", Polymer Review, Vol. IX, page 27 ff, Interscience Publ. 1964):

In this connection the diphenols to be employed are dissolved in aqueous alkaline phase. To this end, the chain-terminators required for producing the polycarbonates according to the invention are added in quantities from 1 to 20 mol. %, relative to moles of diphenol, dissolved in an organic solvent or in bulk. Conversion with phosgene is then effected in the presence of an inert, preferably polycarbonate-dissolving, organic phase. The reaction temperature lies between 0° C. and 40° C. The polyisobutylene-β-halogen-ketocarboxylic acids are added in desired quantity to the reaction as pure substance or dissolved in the solvent forming the organic phase.

The invention further provides a process for producing aromatic polycarbonates containing aspartate-functional silicones, said process being characterised in that aromatic polycarbonates are caused to react with aspartate-functional silicones in solution or in a melt.

In this connection, solutions of the reactants can be mixed in solvents having a boiling-point higher than 100° C., the mixture can be heated to reflux and the reaction mixture can be processed by precipitation or by spray evaporation.

Furthermore, the reactants can be dissolved, mixed and concentrated by evaporation in evaporating extruders. This way of proceeding is the preferred embodiment of the invention.

The reactants may also be mixed in a melt in kneaders or in extruders at temperatures from 170 to 330° C.

The invention further provides a process for producing aromatic polycarbonates containing aspartate-functional silicones, said process being characterised in that bisphenols and aspartate-functional silicones are caused to react with derivatives of carbonic acid, optionally in the presence of chain-terminators and/or branching agents.

In the course of implementing this process according to the invention, methods are adopted that have been described above in connection with the production of the aromatic polycarbonates, such a quantity of aspartate-functional silicones being added that the content amounts to 1 to 30 wt. %, preferably 5 to 15 wt. %.

To the aromatic polycarbonates according to the invention there may be added, either before or after they have been processed, the additives that are conventional for thermoplastic polycarbonates, such as stabilisers, mould-release agents, pigments, flameproofing agents, antistatic agents, fillers and reinforcing materials, in the conventional quantities.

The aromatic polycarbonates according to the invention may be processed into moulded bodies, by, for example, the aromatic polycarbonates which have been isolated in known manner being extruded into granulate and by this granulate, optionally after addition of the aforementioned additives, being processed into various articles in known manner by injection moulding.

The aromatic polycarbonates according to the invention are capable of being employed in the form of moulded bodies in all cases where the polycarbonates known hitherto have been employed, that is to say, in the electrical sector and also in the building sector, for example, specifically when increased resistance to chemicals is demanded.

Examples of uses are films, composite films, extrusion mouldings and injection mouldings with and without fillers or glass-fibre reinforcement, such as, for example, safety helmets, foamed materials, sheets and blow mouldings, as well as medical articles such as hoses and short-term implants.

The aromatic polycarbonates according to the invention serve, moreover, as blend components for thermoplastic moulding compositions.

EXAMPLES

Example 1

Production of the Aspartate-functional Silicone 1,000 g polydimethylsiloxane with a molar mass of about 400,000 g/mol are added to 20 g aminopropyl diethoxysilane and 0.2 g dibutyltin oxide, and heating to 200° C. is effected for 4 h. Then 100 g diethyl fumarate are added, cooling is effected to 100° C., and further stirring is effected for 3 h. Then a vacuum of 20 mbar is applied and the excess diethyl fumarate is distilled off, heating to 200° C. being effected briefly at the end of the distillation. The product was characterised by means of NMR spectroscopy.

Example 2

495 g of the product from Example 1 are dissolved in 500 g methylene chloride, and this solution is charged to the solution of 4,455 g polycarbonate with a relative solution viscosity of 1.28 (0.5% in methylene chloride, 25° C.) in 2 l methylene chloride and 10 l chlorobenzene. The mixture is concentrated by evaporation in an evaporating extruder with vacuum head (ZSK 32) at 260 to 280° C. 4,480 g of a polycarbonate modified with aspartate-functional silicone are obtained having a relative solution viscosity of 1.29, an MVI of 12 and a viscous/brittle transition in the notched-bar impact test of −50° C. The ESC stability was determined by immersion of a prestressed rod in isooctane/toluene, and the impact strength was measured after exposure to the air (1 h at room temperature and 1 h at 100° C.).

Outer-fibre strain 0.6% 30 s immersion: 3×n.g., 97 kJ/m$^2$, no cracks
1.0% 30 s immersion: 1×n.g., 93 kJ/m$^2$, no cracks
0.6% 5 min immersion: 89 kJ/m$^2$, no cracks
1.0% 5 min immersion: 80 kJ/m$^2$, no cracks.

Example 3

7,999 g of 45-% NaOH, 36 kg water, 4,109 g bisphenol A and 81 g p-tert-butylphenol are charged, 508 g of the product from Example 1 dissolved in 450 g methylene chloride, 10 l chlorobenzene and 27 l methylene chloride are added and 2,700 g phosgene are introduced at 20° C. 25 ml N-ethylpiperidine are added, and stirring is continued for 1 h. Acidification is effected with HCl, the phases are separated, and the organic phase is washed neutral. Concentration by evaporation is effected in an evaporating extruder with vacuum head (ZSK 32) at 260 to 280° C. 4.28 kg of a polycarbonate modified with aspartate-functional silicone are obtained having a relative solution viscosity of 1.30, an MVI of 6 and a viscous/brittle transition in the notch impact test of −40° C. The ESC stability was determined by immersion of a prestressed rod in isooctane/toluene, and the impact strength was measured after exposure to the air (1 h at room temperature and 1 h at 100° C.).

Outer-fibre strain:

0.6% 30 s immersion: 3×n.g., 96 kJ/m$^2$, edge cracks
1.0% 30 s immersion: 1×n.g., 92 kJ/m$^2$, edge cracks
0.6% 5 min immersion: 5 kJ/m$^2$, transverse cracks
1.0% 5 min immersion: 4 kJ/m$^2$, transverse cracks.

Comparison 1

Polycarbonate with a relative solution viscosity of 1.28 displays an MVI of 6, a viscous/brittle transition of +10° C. and the following ESC behaviour:

0.6% 30 s immersion: 3 kJ/m$^2$, surface cracks
1.0% 30 s immersion: 2 kJ/m$^2$, transverse cracks
0.6% 5 min immersion: shattered
1.0% 5 min immersion: shattered The tests show that the product obtained by solution compounding according to Example 2 exhibits the best level of properties in terms of all the properties investigated (flowability, low-temperature notch impact strength, ESC behaviour). The product according to Example 3 which was obtained by incorporation during the synthesis is superior to conventional polycarbonate (Comparison 1) but does not attain the properties of the product according to Example 2 which was produced by compounding.

What is claimed is:

1. Aromatic polycarbonates containing 1 to 30 wt. % aspartate functional silicones.

2. Aromatic polycarbonates according to claim 1 containing 5 to 15 wt. % aspartate-functional silicones.

3. A process for producing aromatic polycarbonates containing aspartate-functional silicones, characterised in that bisphenols and aspartate-functional silicones are caused to react with derivatives of carbonic acid in the presence of chain-terminators and/or branching agents, or aromatic polycarbonates are caused to react with aspartate-functional silicones in solution or in a melt.

4. Method for the production of moulded bodies, comprising a) forming polycarbonates according to claim 1 into a granulate: and b) forming the granulate by injection molding.

5. Moulded bodies produced from polycarbonate as defined in claim 1.

6. Method for the production of thermoplastic moulding compositions, comprising adding polycarbonates according to claim 1 to a blend.

7. Moulding compositions containing polycarbonate as defined in claim 1.

8. Polycarbonate, obtained by conversion of bisphenols, aspartate-functional silicones and derivatives of carbonic acid by the phase interface process.

9. Polycarbonate, obtained by reaction of aromatic polycarbonates with aspartate-functional silicones in solution or in a melt.

10. A process for producing polycarbonate comprising a) adding fumarate and/or maleates of the formula (I)

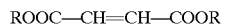

where

R stands for a $C_1$–$C_4$ alkyl or alkenyl residue onto amino-functionalized silicones to produce an aspartate-functionalized silicone, and b) reacting the aspartate-functional silicone with a bisphenol and a derivative of carbonic acid.

* * * * *